US012782745B2

(12) United States Patent
Regaard

(10) Patent No.: US 12,782,745 B2
(45) Date of Patent: Nov. 3, 2026

(54) FOCUSING DEVICE HAVING AN IMAGE PLANE EXTENDING PARALLEL OR CONGRUENT TO A TARGET PLANE

(71) Applicant: TRUMPF Lasersystems for Semiconductor Manufacturing GmbH, Ditzingen (DE)

(72) Inventor: Boris Regaard, Stuttgart (DE)

(73) Assignee: TRUMPF LASERSYSTEMS FOR SEMICONDUCTOR MANUFACTURING GMBH, Ditzingen (DE)

( * ) Notice: Subject to any disclaimer, the term of this patent is extended or adjusted under 35 U.S.C. 154(b) by 294 days.

(21) Appl. No.: 18/420,916

(22) Filed: Jan. 24, 2024

(65) Prior Publication Data

US 2024/0168306 A1 May 23, 2024

Related U.S. Application Data

(63) Continuation of application No. PCT/EP2022/071088, filed on Jul. 27, 2022.

(30) Foreign Application Priority Data

Jul. 28, 2021 (EP) .................................... 21188167

(51) Int. Cl.

*G02B 27/16* (2006.01)
*G02B 27/10* (2006.01)
*H05G 2/00* (2006.01)

(52) U.S. Cl.

CPC ......... *G02B 27/16* (2013.01); *G02B 27/1006* (2013.01); *H05G 2/0086* (2024.08); *H05G 2/009* (2024.08)

(58) Field of Classification Search

CPC .... G02B 19/00; G02B 19/0095; G02B 27/16; G02B 27/10; G02B 27/0961;
(Continued)

(56) References Cited

U.S. PATENT DOCUMENTS 10,268,119 B2 4/2019 Nagai et al.
10,555,408 B2 2/2020 Yanagida et al.
(Continued)

FOREIGN PATENT DOCUMENTS

JP 2009105006 A 5/2009
JP 2011082473 A 4/2011
(Continued)

OTHER PUBLICATIONS

Seunghyuk Chang, "Linear astigmatism of confocal off-axis reflective imaging systems with N-conic mirrors and its elimination," Journal of the Optical Society of America A, 2015, pp. 852-859, vol. 32, Issue 5, Optica Publishing Group, Washington DC, USA.

*Primary Examiner* — Jie Lei
(74) *Attorney, Agent, or Firm* — LEYDIG, VOIT & MAYER, LTD.

(57) ABSTRACT

A focusing device for focusing at least two laser beams onto a moving target material in a target region for generating extreme ultraviolet (EUV) radiation is provided. The focusing device includes a first focusing element for focusing a first laser beam onto the target material at a first position in the target region, a second focusing element for focusing a second laser beam onto the target material at a second position in the target region, and a reflective optical element for reflecting the EUV radiation generated by the target material. An optical axis of the first focusing element and/or an optical axis of the second focusing element are aligned approximately parallel or congruently with respect to an optical axis of the reflective optical element.

13 Claims, 3 Drawing Sheets

(58) Field of Classification Search

CPC ............ G02B 27/0977; G02B 27/0927; G02B 27/1006; G02B 27/142; G02B 27/143; G02B 7/08; G02B 13/146; G02B 1/11; G02B 1/12; G02B 26/0816; G02B 26/0875; H05G 2/00; H05G 2/006; H05G 2/005; H05G 2/008; H05G 2/009; H05G 2/0086; H01S 3/00; H01S 3/005; H01S 3/0085; H01S 3/2391

USPC ........ 359/350–352, 355, 359, 360, 823, 589

See application file for complete search history.

(56) References Cited

U.S. PATENT DOCUMENTS

| | | | |
|---|---|---|---|
| 10,644,473 | B2 | 5/2020 | Brunne et al. |
| 2012/0091893 | A1 | 4/2012 | Yanagida et al. |
| 2012/0241649 | A1 | 9/2012 | Nishihara et al. |
| 2012/0307851 | A1 | 12/2012 | Hori et al. |
| 2015/0043599 | A1 | 2/2015 | Yanagida et al. |
| 2015/0137011 | A1 | 5/2015 | Pate et al. |
| 2016/0195729 | A1 | 7/2016 | Lambert |
| 2016/0198557 | A1 | 7/2016 | Enzmann |

FOREIGN PATENT DOCUMENTS

| | | | |
|---|---|---|---|
| JP | 2012134433 | A | 7/2012 |
| JP | 2016512383 | A | 4/2016 |
| JP | 2021517662 | A | 7/2021 |
| TW | I609248 | B | 12/2017 |
| WO | WO 2008108123 | A1 | 9/2008 |
| WO | WO 2014192872 | A1 | 12/2014 |
| WO | WO 2015036024 | A1 | 3/2015 |
| WO | WO 2015036025 | A1 | 3/2015 |
| WO | WO 2019192841 | A1 | 10/2019 |

FOCUSING DEVICE HAVING AN IMAGE PLANE EXTENDING PARALLEL OR CONGRUENT TO A TARGET PLANE

CROSS REFERENCE TO RELATED APPLICATIONS

This application is a continuation of International Application No. PCT/EP2022/071088 (WO 2023/006821 A1), filed on Jul. 27, 2022, and claims benefit to European Patent Application No. EP 21 188 167.7, filed on Jul. 28, 2021. The aforementioned applications are hereby incorporated by reference herein.

FIELD

Embodiments of the present invention relate to a focusing device for focusing at least two laser beams onto a target material moving in a target region for generating extreme ultraviolet (EUV) radiation, for lithography purposes. Embodiments of the present invention also relate to an EUV beam generating apparatus comprising such a focusing device.

BACKGROUND

Focusing devices and EUV beam generating apparatuses have been disclosed by WO 2015/036024 A1 and WO 2015/036025 A1.

In those focusing devices and beam generating apparatuses, the efficiency of the target irradiation is reduced as a result of the respective laser beams being focused onto the target material at different positions in the target region from different directions in each case.

SUMMARY

Embodiments of the present invention provide a focusing device for focusing at least two laser beams onto a moving target material in a target region for generating extreme ultraviolet (EUV) radiation. The focusing device includes a first focusing element for focusing a first laser beam onto the target material at a first position in the target region, a second focusing element for focusing a second laser beam onto the target material at a second position in the target region, and a reflective optical element for reflecting the EUV radiation generated by the target material. An optical axis of the first focusing element and/or an optical axis of the second focusing element are aligned approximately parallel or congruently with respect to an optical axis of the reflective optical element.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
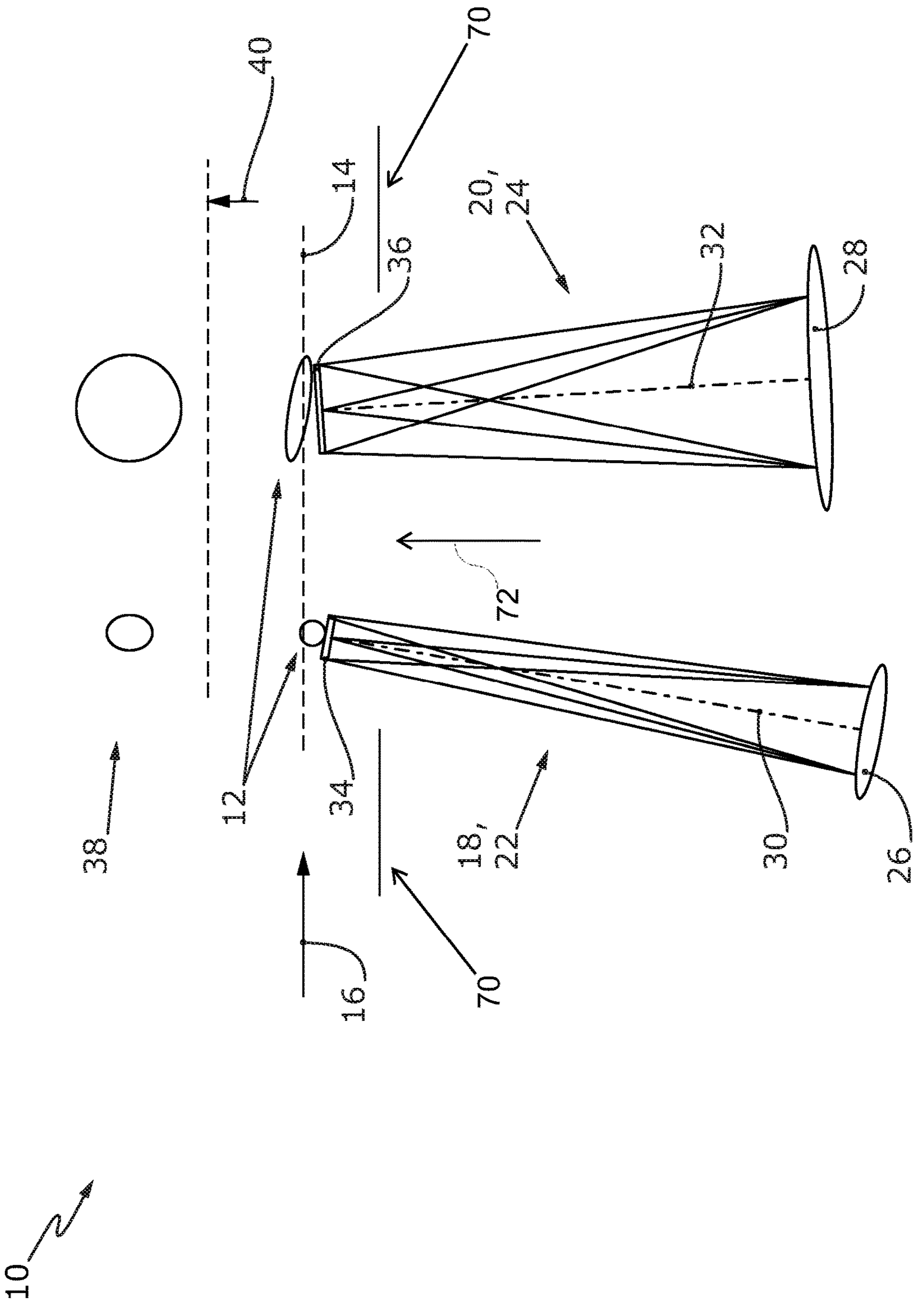
FIG. 1 schematically shows a conventional focusing device.

Embodiments of the invention provide a focusing device and an EUV beam generating apparatus which enable more efficient irradiation of the target material.

According to embodiments of the present invention, a focusing device includes:

a) a first focusing element for focusing a first laser beam onto the target material at a first position in the target region;

b) a second focusing element for focusing a second laser beam onto the target material at a second position in the target region; and c) a reflective optical element for reflecting the EUV radiation generated by the target material, d) optical axes of the first focusing element and/or of the second focusing element aligned, in particular with a margin of ±4°, preferably with a margin of ±2°, parallel or congruently with respect to the optical axis of the reflective optical element.

This results in an image plane of the first focusing element and/or an image plane of the second focusing element being aligned perpendicularly or approximately perpendicularly to the optical axis of the reflective optical element. In particular, the target material can move in a plane (target plane) which is approximately perpendicular or perpendicular to the optical axis of the reflective optical element and thus approximately parallel, parallel or congruent with respect to one of the image planes of the two focusing elements. As a result of the optical axis of at least one of the focusing optical elements being aligned approximately parallel, parallel or congruently with respect to the optical axis of the reflective optical element, the target material is irradiatable effectively.

In this case, the reflective optical element is suitable in particular for reflecting EUV radiation emitted during the irradiation of the target material with laser radiation. The reflective optical element can be embodied e.g. as a near-normal incidence collector mirror having a reflective surface in the form of an ellipsoid of revolution, wherein the reflective optical element has a first focal point near or in a region in which the target material is irradiated with the laser beam(s).

According to embodiments of the invention, at least one, preferably both optical axes of the two focusing elements be aligned perpendicularly or almost perpendicularly to a flight direction or trajectory of the target material, with the target material moving from a first position to a second position in the target region. In this case, the first laser beam can be guided into the target region on a first beam path of the focusing device. The second laser beam can be guided into the target region on a second beam path of the focusing device. In this case, the principal axis of the first and/or second beam path can be parallel and offset or tilted with respect to the optical axis of the focusing element. By contrast, in the case of a “traditional” imaging, the optical axis is coaxial with respect to the principal axis of the beam path of the laser beam. As a result, the two optical axes have to be tilted with respect to one another in order to spatially separate the laser beams in the near field and to superimpose them in the far field.

In one preferred embodiment, the focusing elements can have parallel or identical, in particular with a margin of ±4°, preferably with a margin of ±2°, parallel or identical optical axes. This results in approximately parallel, parallel or congruent image planes for the two focusing elements. The target material is irradiatable effectively as a result.

The first focusing element can be embodied in the form of an element group. As an alternative or in addition thereto, the second focusing element can be embodied in the form of an element group.

The principal axis of the first beam path preferably does not extend coaxially with respect to the optical axis of the first focusing element. The principal axis of the second beam path preferably does not extend coaxially with respect to the optical axis of the second focusing element.

The respective principal axes of the beam paths can be collimated and collinear upstream of the focusing elements. In a possible alternative configuration, the individual collimated laser beams can also be arranged non-parallel to one another.

In the case of one or more of the laser beams having been imaged obliquely in the beam path upstream of the respective focusing element (e.g. upon passing through a collimating lens, the optical axis of which is aligned obliquely with respect to a direction of propagation of the laser beam), the focusing element, in accordance with the Scheimpflug condition, is preferably tilted relative to a plane perpendicular to the principal axis of the beam path of the laser beam in order to align the image plane in the plane in which the target material is moving. In the case, too, of the individual collimated laser beams being arranged non-parallel to one another, the focusing elements, in particular their principal planes, in accordance with the Scheimpflug condition, are preferably tilted relative to a plane perpendicular to the principal axis of the beam path of the laser beam in order to align the focus plane in the plane in which the target material is moving.

The target material is preferably embodied in the form of a tin droplet. A plasma that emits EUV radiation can be generated in the tin droplet by way of the irradiation with laser radiation.

It is further preferred for the principal axis of the first beam path and/or the principal axis of the second beam path to be offset, in particular in parallel fashion, with respect to the optical axis of the respective focusing element. One focusing element or both focusing elements is/are thereby embodied as rotationally asymmetrical with respect to their respective optical axes. A distortion-free projection in the image plane can be achieved as a result. By way of example, a cross-sectionally circular laser beam or cross-sectionally circular laser beams can have a circular projection.

Preferably, at least one focusing element is embodied in the form of a segment of a rotationally symmetrical focusing element. As a result, the focusing device is of simple constructional design and the beam paths are calculable comparatively easily.

If the principal axes of the beam paths are offset, a moving target material can be irradiated by the two laser beams with a temporal offset. In other words, a moving target material can be impinged on with a temporal (and thus also spatial) offset by virtue of the optical axes of the two focusing optical elements being displaced parallel to one another so that each optical axis passes through the respective target material. The optical axes of the focusing elements are offset with respect to one another by preferably less than 3 mm, in particular less than 1 mm.

With further preference, at least one focusing element, in particular both beam shaping elements, can be embodied in the form of a lens or a mirror. In the case of a mirror, in particular an off-axis parabolic mirror or a combination of off-axis parabolic mirror and off-axis ellipsoidal mirror can be used.

The first beam shaping element and/or the second beam shaping element can be arranged within a vacuum chamber. The vacuum chamber can have a first opening for the first laser beam to enter the vacuum chamber and/or a second opening for the second laser beam to enter the vacuum chamber.

A deflection mirror, in particular a double mirror arrangement, can be provided in the first beam path and/or in the second beam path. The double mirror arrangement leads to a significant, preferably even complete, reduction of astigmatism (cf. Seunghyuk Chang: Linear astigmatism of confocal off-axis reflective imaging systems with N-conic mirrors and its elimination; Journal of the Optical Society of America A, Vol. 32, No. 5/May 2015, pages 852-859). In the case of this arrangement, however, the laser beam to be imaged is not guided on a theoretical optical axis that results in an imaging free of astigmatism, but rather on an entrance side (collimated entrance beam) is offset parallel thereto in order to achieve the desired effect of a tilted principal axis on an exit side with an image plane parallel to the target plane. In the equivalent model of a lens optical unit, this corresponds to the displacement of the principal axis of the beam path of the laser beam with respect to the optical axis of the lens. In this case, the angle of the principal axis of the beam path of the laser beam on the exit side corresponds to the tangent of the distance of the principal axis of the beam path of the laser beam on the entrance side divided by the effective focal length EFL.

The focusing device can have a third beam path for guiding a third laser beam into the target region. The target material can be irradiated on its path firstly by the first laser beam, subsequently by the third laser beam and finally by the second laser beam. The third laser beam can impinge on the first focusing element at an angle of more than 2°, in particular of more than 4°, with respect to the first laser beam. As a result, the third beam path and hence the third laser beam likewise has an image plane extending approximately parallel, parallel or congruently with respect to the plane in which the target material is moving. The principal axis of the third beam path and hence of the third laser beam—in particular after passing through the first focusing element—preferably does not extend coaxially with respect to the optical axis of the first focusing element. Alternatively, the third beam path or further beam paths can also have a third focusing element and thus a spatially separate optical axis with the same constraints as the first two beam paths.

Embodiments of the invention also provide an EUV beam generating apparatus comprising a vacuum chamber, into which the target material is introducible into the target region for the purpose of generating EUV radiation, wherein the EUV beam generating apparatus comprises the focusing device described here and also a first beam source for generating the first laser beam and a second beam source for generating the second laser beam.

In this case, principal axes of the respective laser beams preferably correspond to the principal axes of the respective beam paths along which they are guided.

The laser beams can have different wavelengths. In particular, the first laser beam can have a wavelength of between 500 nm and 1200 nm and the second laser beam can have a wavelength of between 8 μm and 12 μm. In particular in the case of the wavelengths mentioned, the first optical element is preferably embodied in the form of a lens composed of quartz glass, borosilicate crown glass, sapphire glass, or in the form of a mirror composed of aluminum or silicon carbide or copper. In particular in the case of the wavelengths mentioned, the second optical element is preferably embodied in the form of a lens composed of zinc selenide or (artificial) diamond, or in the form of a mirror composed of copper. The materials mentioned have good optical properties in conjunction with good processability and good cooling capacity.

In a preferred embodiment of the invention, the first laser beam and/or the second laser beam are/is pulsed. This makes it possible, inter alia, for the power introduced into the target material and hence the power of the emitted EUV radiation to be high.

The EUV beam generating apparatus can comprise a third beam source for generating the third laser beam, wherein the principal axis of the third laser beam preferably corresponds to the principal axis of the third beam path.

The third laser beam can be pulsed. The pulsed third laser beam can be used for generating an intermediate pulse between a pulse as a result of the first laser beam and pulse as a result of the second laser beam onto the target material.

Further advantages of the invention are evident from the description and the drawing. Likewise, according to embodiments of the invention, the features mentioned above and those that will be explained still further can be used in each case individually by themselves or as a plurality in any desired combinations. The embodiments shown and described should not be understood as an exhaustive enumeration, but rather are of exemplary character for outlining the invention.

FIG. 1 shows a focusing device 10 in accordance with the prior art. This involves prior art which is known to the applicant, but is not necessarily published prior art.

The focusing device 10 comprises a target material 12 moving in a target plane 14 in flight direction 16. The target material 12 is irradiated by a first laser beam 18 and a second laser beam 20. The irradiation of the target material 12 gives rise to EUV radiation that is reflected by a reflective optical element 70. The reflective optical element 70 has an optical axis 72, on which in particular a first and a second focal point of the reflective optical element 70 are arranged. In particular, the target material 12 is irradiated in such a way that the EUV radiation arises at the first focal point and is focused onto the second focal point by the reflective optical element 70. The target material preferably moves in a target plane 14 extending perpendicularly to the optical axis 72 of the reflective optical element 70. The first laser beam 18 is guided in a first beam path 22 and the second laser beam 20 is guided in a second beam path 24. A first focusing element 26 is arranged in the first beam path 22. A second focusing element 28 is arranged in the second beam path 24. The focusing elements 26, 28 are each embodied in the form of optically focusing elements. The focusing elements 26, 28 can have different focal lengths.

The focusing elements 26, 28 have optical axes 30, 32 extending coaxially with respect to the principal axes of the beam paths 22, 24 of the laser beams 18, 20. The laser beams 18, 20 are not superimposable on account of their wavelength and/or polarization. The optical axes 30, 32 are therefore at an angle of more than 4° with respect to one another and with respect to the optical axis 72 of the reflective optical element 70. As a result, the image planes 34, 36 are also at an angle of more than 4° with respect to the target plane 14. This results in distorted imagings 38 of the laser beams 18, 20 on the target material 12 (when viewed in the plane of the flight direction). When the target material 12 is viewed in viewing direction 40, for example cross-sectionally circular laser beams 18, 20 are imaged elliptically if the target material 12 is not spherical, but rather deformed. A deformation occurs here in particular as a result of the irradiation. An ineffective irradiation of the target material 12 takes place as a result.

Figure 2:
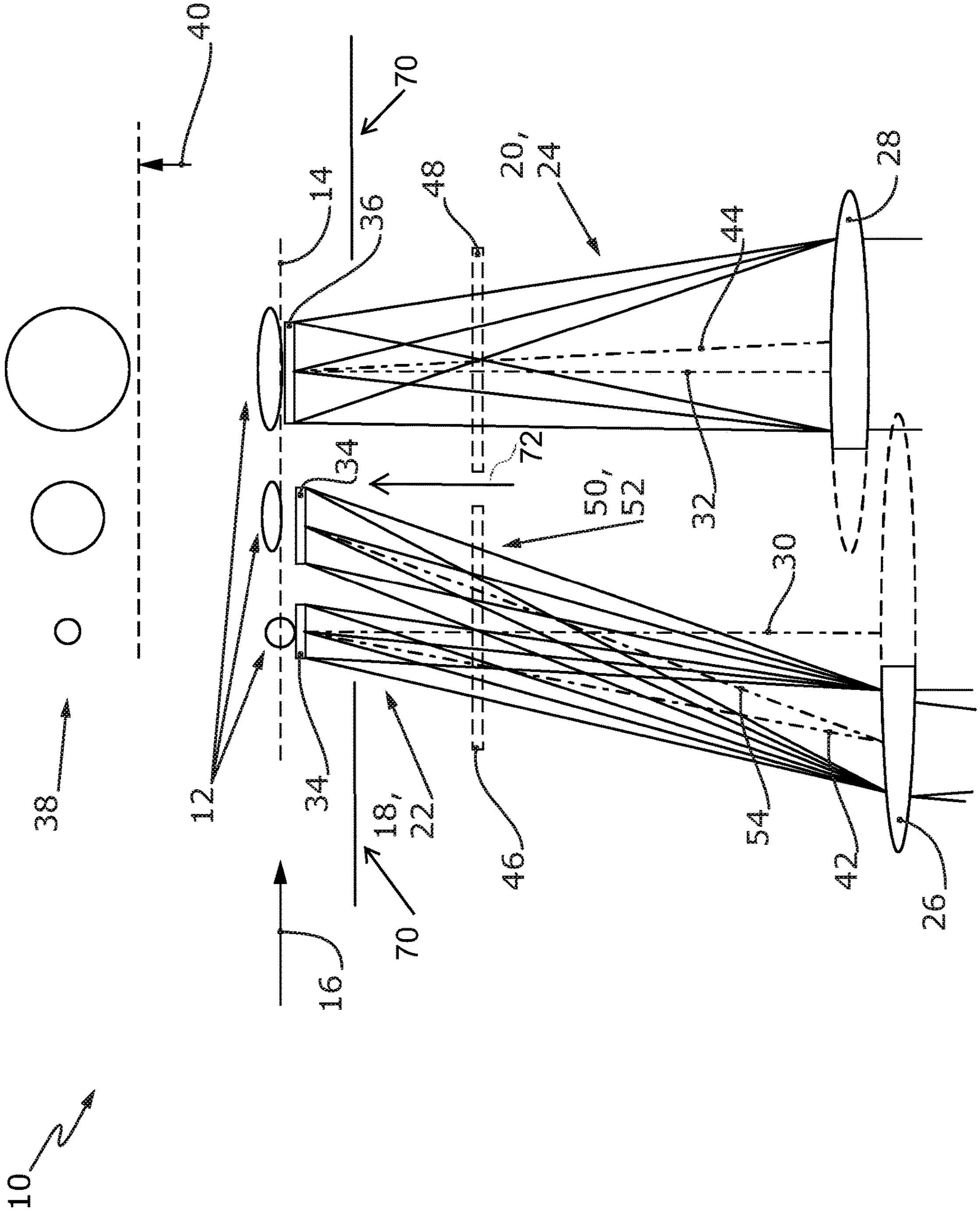
FIG. 2 schematically shows a focusing device according to an embodiment of the invention.

FIG. 2 shows a first embodiment of a focusing device 10 according to embodiments of the invention. Apart from the differences discussed below, the set-up of the focusing device 10 corresponds to the set-up of the known focusing device 10 in accordance with FIG. 1, to which reference is made in order to avoid repetitions.

As is evident from FIG. 2, the optical axes 30, 32 are parallel to the optical axis 72 of the reflective optical element 70. Alternatively, it is also possible for only one of the two optical axes 30, 32 to be parallel to the optical axis 72 of the reflective optical element 70. As a result, the image plane(s) 34, 36 of the laser beam(s) 18, 20 extends/extend parallel or congruently with respect to a plane encompassing the trajectory of the target material. The imagings 38 are undistorted, and so an effective irradiation can take place.

In the present case, furthermore, the principal axes 42, 44 of the beam paths 22, 24 along which the laser beams 18, 20 are guided after passing through the focusing elements 34, 36 are offset with respect to the optical axes 30, 32. Alternatively, it is also possible for only one of the principal axes 42, 44 of the beam paths 22, 24 to extend offset with respect to the respective optical axis 30, 32. As indicated by dashed lines in FIG. 2, the focusing elements 26, 28 are preferably embodied as rotationally symmetrical with respect to their respective optical axes 30, 32, but rotationally asymmetrical with respect to the principal axes 42, 44. Alternatively, it is also possible for only one of the focusing elements 26, 28 to be preferably embodied as rotationally symmetrical with respect to the respective optical axis 30, 32, but rotationally asymmetrical with respect to the principal axis 42, 44.

The focusing elements 26, 28 are preferably embodied in the form of optically focusing elements, in particular each in the form of a converging lens or a collecting mirror. Alternatively, it is also possible for only one of the focusing elements 26, 28 to be preferably embodied in the form of an optically focusing element, in particular in the form of a converging lens or a collecting mirror.

Deflection mirror(s) 46, 48 can be arranged in one or both beam paths 22, 24, said deflection mirrors merely being indicated schematically in FIG. 2. Such deflection mirrors 46, 48 do not influence the optical imaging according to embodiments of the invention. The deflection mirrors 46, 48 can be provided in each case at least in pairs, i.e. in each case in the form of at least one double mirror arrangement (not shown).

In the exemplary embodiment in accordance with FIG. 2, the target material 12 is irradiated by a third laser beam 50, which is guided on a third beam path 52 with a principal axis 54. The third beam path 52 passes through the first beam shaping element 26. The principal axis 54 of the third beam path 52 is at an angle of more than 2°, in particular of more than 4°, with respect to the principal axis 42 of the first beam path 22.

The laser beams 18, 20, 50 can cause the target material 12 to partly vaporize. As a result, the movement of the target material 12 can take place only approximately in the target plane 14 in some cases. The deviations of the trajectory of the target material 12 from the target plane 14 are illustrated schematically in an exaggerated manner, however, in the figures.

Figure 3:
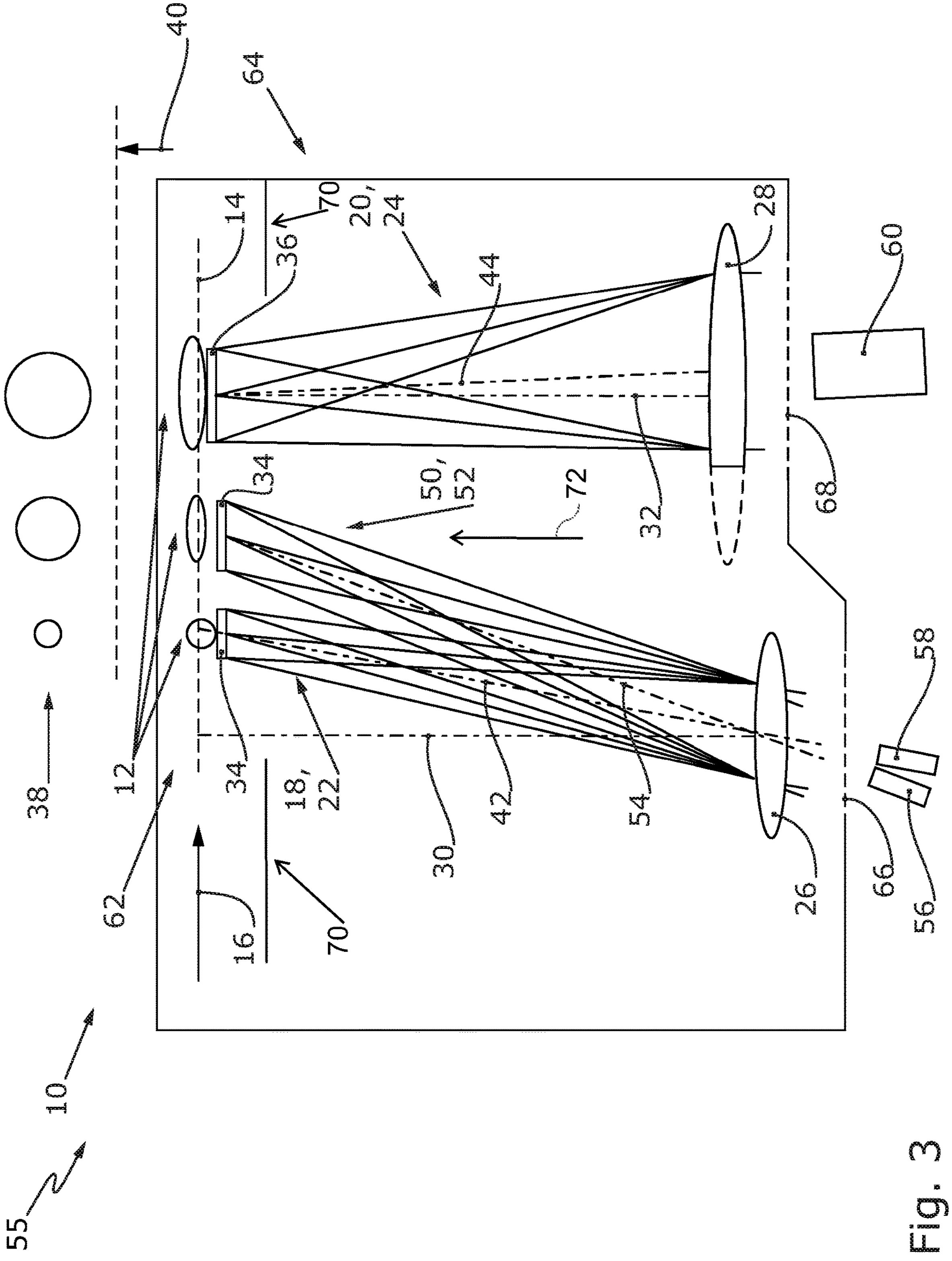
FIG. 3 schematically shows an EUV beam generating apparatus according to an embodiment of the invention.

FIG. 3 shows a second embodiment of a focusing device 10 according to embodiments of the invention as part of an EUV beam generating apparatus 55. Apart from the differences discussed below, the set-up of the focusing device 10 corresponds to the set-up of the known focusing device 10 in accordance with FIG. 2, to which reference is made in order to avoid repetitions.

The first laser beam 18 and optional third laser beam 50 shown in FIG. 3 impinge on the beam shaping element 26 at an angle of more than 2°, in particular of more than 4°, with respect to the optical axis 30 of the first focusing element 26. In this case, the principal axis 42 of the first beam path 22 and the principal axis 54 of the optional third beam path 52 intersect the optical axis 30 of the first focusing element 26 in the first focusing element 26. In the first focusing element 26, therefore, the principal axes 42, 54 are non-offset with respect to the optical axis 30 of the first focusing element 26. This gives rise to a slight distortion of the imaging 38 (and also coma in the far field). However, in this embodiment, too, the beam paths 22, 52 have the common or parallel image plane according to embodiments of the invention in the plane encompassing the trajectory of the target material.

FIG. 3 schematically illustrates a first beam source 56 for generating the first laser beam 18, a second beam source 58 for generating the second laser beam 20, and an optional third beam source 60 for generating the third laser beam 50.

FIG. 3 furthermore reveals that the target material 12 is introduced into a target region 62 of a vacuum chamber 64. The vacuum chamber 64 can have a first opening 66 for the first laser beam 18 or first beam path 22 to enter. The optional third laser beam 50 or third beam path 52 can also enter the vacuum chamber 64 through the first opening 66. As an alternative or in addition thereto, the vacuum chamber 64 can have a second opening 68 for the second laser beam 20 or second beam path 24 to enter.

As described above, embodiments of the invention relate to a focusing device 10, in particular for generating EUV radiation. The focusing device 10 is designed to illuminate target material 12 on a target plane 14. The focusing device 10 comprises, at the very least, at least one beam shaping element 26, 28, the optical axis 30, 32 thereof being perpendicular to the target plane 14. As a result, the image plane of a laser beam 18, 20 guided by one of the focusing elements 26, 28 is aligned parallel to the target plane 14. This enables the efficient irradiation of the target material 12. A completely distortion-free imaging of at least one laser beam 18, 20 can be achieved by means of the principal axis of the beam path of said laser beam 18, 20 being offset with respect to the optical axis 30, 32 of the focusing element 26, 28 by which said laser beam 18, 20 is guided. One of the focusing elements 26, 28 can guide a third laser beam 50 for intermediate irradiation of the target material 12.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Focusing device
12 Target material
14 Target plane
16 Flight direction
18 First laser beam
20 Second laser beam
22 First beam path
24 Second beam path
26 First focusing element
28 Second focusing element
30 Optical axis of the first focusing element 26
32 Optical axis of the second focusing element 28
34 Focal plane of the first focusing element 26
36 Focal plane of the second focusing element 28
38 Imagings
40 Viewing direction
42 Principal axis of the first beam path 22
44 Principal axis of the second beam path 24
46 Deflection mirror
48 Deflection mirror
50 Third laser beam
52 Third beam path
54 Principal axis of the third beam path 52
55 EUV beam generating apparatus
56 First beam source
58 Second beam source
60 Third beam source
62 Target region
64 Vacuum chamber
66 First opening of the vacuum chamber 62
68 Second opening of the vacuum chamber 62
70 Reflective optical element
72 Optical axis of the reflective optical element 70

The invention claimed is:

1. A focusing device for focusing at least two laser beams onto a moving target material in a target region for generating extreme ultraviolet (EUV) radiation, the focusing device comprising:
- a first focusing element for focusing a first laser beam onto the target material at a first position in the target region;
- a second focusing element for focusing a second laser beam onto the target material at a second position in the target region; and
- a reflective optical element for reflecting the EUV radiation generated from the target material;

wherein an optical axis of the first focusing element and an optical axis of the second focusing element are aligned parallel or congruently with respect to an optical axis of the reflective optical element.

2. The focusing device as claimed in claim 1, wherein:

the first focusing element is configured to guide the first laser beam along a first principal axis between the first focusing element and the target region, wherein the first principal axis is offset and/or tilted with respect to the optical axis of the first focusing element; and/or the second focusing element is configured to guide the second laser beam along a second principal axis between the second focusing element and the target region, and wherein the second principal axis is offset and/or tilted with respect to the optical axis of the second focusing element.

3. The focusing device as claimed in claim 2, wherein a first beam shaping element is embodied as a segment of the first focusing element configured as rotationally symmetrical with respect to the optical axis of the first focusing element; and/or a second beam shaping element is embodied as a segment of the second focusing element configured as rotationally symmetrical with respect to the optical axis of the second focusing element.

4. The focusing device as claimed in claim 3, wherein the first beam shaping element is embodied as a lens or a mirror; and/or the second beam shaping element is embodied as a lens or a mirror.

5. The focusing device as claimed in claim 2, wherein the first focusing element is configured to guide a third laser beam along a third principal axis into the target region, wherein the third principal axis forms an acute angle of more than 2° with respect to the first principal axis of the first laser beam.

6. The focusing device as claimed in claim 1, wherein the optical axis of the first focusing element and the optical axis of the second focusing element are aligned parallel or congruently with respect to the optical axis of the reflective optical element, and the optical axis of the first focusing element and the optical axis of the second focusing element are offset by less than 3 mm with respect to one another.

7. The focusing device as claimed in claim 1, wherein a first double mirror arrangement is disposed downstream of the first focusing element as viewed in a beam direction; and/or wherein a second double mirror arrangement is disposed downstream of the second focusing element as viewed in the beam direction.

8. An extreme ultraviolet (EUV) beam generating apparatus comprising a vacuum chamber, into which a target material is introducible into a target region for generating EUV radiation, the EUV beam generating apparatus comprising:

a focusing device for focusing at least two laser beams onto the target material in the target region as claimed in claim 1, and a first beam source for generating the first laser beam and a second beam source for generating the second laser beam.

9. The EUV beam generating apparatus as claimed in claim 8, wherein the first laser beam has a first wavelength, and the second laser beam has a second wavelength different than the first wavelength.

10. The EUV beam generating apparatus as claimed in claim 9, wherein the first wavelength is between 500 and 1200 nm, and the second wavelength is between 8 μm and 12 μm.

11. The EUV beam generating apparatus as claimed in claim 8, wherein the first laser beam is pulsed and/or the second laser beam is pulsed.

12. The EUV beam generating apparatus as claimed in claim 8, further comprising a third beam source for generating a third laser beam.

13. The EUV beam generating apparatus as claimed in claim 12, wherein the third laser beam is pulsed and/or has a different wavelength than the second laser beam and/or a different polarization than the second laser beam.

* * * * *